United States Patent
Arkko et al.

(10) Patent No.: US 7,401,216 B2
(45) Date of Patent: Jul. 15, 2008

(54) ADDRESSING MECHANISMS IN MOBILE IP

(75) Inventors: Jari Arkko, Kauniainen (FI); Jukka Ylitalo, Espoo (FI); Pekka Nikander, Helsinki (FI)

(73) Assignee: Telefonaktiebolaget LM Ericsson (publ), Stockholm. (SE)

( * ) Notice: Subject to any disclaimer, the term of this patent is extended or adjusted under 35 U.S.C. 154(b) by 872 days.

(21) Appl. No.: 10/277,945

(22) Filed: Oct. 23, 2002

(65) Prior Publication Data

US 2003/0084293 A1    May 1, 2003

(30) Foreign Application Priority Data

Oct. 26, 2001    (GB) ................... 0125715.3

(51) Int. Cl.
*H04L 9/00* (2006.01)
(52) U.S. Cl. .................. 713/153; 713/156; 380/282; 709/223
(58) Field of Classification Search .................. 713/153
See application file for complete search history.

(56) References Cited

U.S. PATENT DOCUMENTS 4,759,063 A * 7/1988 Chaum .................. 380/30

(Continued)

FOREIGN PATENT DOCUMENTS

| EP | 1 202 591 A2 | 5/2002 |
|---|---|---|
| GB | 2 367 986 A | 4/2002 |
| WO | 01/31472 A1 | 5/2001 |
| WO | 02/11373 A2 | 2/2002 |

OTHER PUBLICATIONS

Sufatrio et al, "Mobile IP Registration Protocol: A Security Attack and New Secure Minimal Public-Key Based Authentication", Parallel Architectures, Algorithms, and Networks, 1999, (I-Span '99), Proceedings, Fourth International Symposium on Perth/Fremantle, WA, Australia, Jun. 23-25, 1999, Los Alamitos, CA, US, IEEE Comput. Soc., US, Jun. 23, 1999, pp. 364-369.

(Continued)

*Primary Examiner*—Gilberto Barron, Jr.
*Assistant Examiner*—Samson B Lemma
(74) *Attorney, Agent, or Firm*—Nixon & Vanderhye, P.C.

(57) ABSTRACT

A method of delegating responsibility for an IP address owned by a first IP network node to a second IP network node, at least a part of the IP address being derivable from a public key of a public/private key pair belonging to the first node. The method comprises notifying the first node of a public key of a public/private key pair belonging to the second node, at the first node, signing the public key of the second node with the private key of the first node to provide an authorisation certificate, and sending the authorisation certificate from the first node to the second node, wherein the authorisation certificate is subsequently included with messages relating to said IP address and signed with the private key of the second node, sent from the second node to receiving nodes, and is used by the receiving nodes to verify the second node's claim on the IP address.

12 Claims, 3 Drawing Sheets

U.S. PATENT DOCUMENTS

| | | | | |
|---|---|---|---|---|
| 6,292,897 | B1* | 9/2001 | Gennaro et al. | 713/175 |
| 6,308,277 | B1* | 10/2001 | Vaeth et al. | 726/10 |
| 6,513,116 | B1* | 1/2003 | Valente | 713/155 |
| 6,826,690 | B1* | 11/2004 | Hind et al. | 713/186 |
| 6,988,210 | B1* | 1/2006 | Audebert | 713/155 |
| 7,032,242 | B1* | 4/2006 | Grabelsky et al. | 726/11 |
| 2002/0106085 | A1* | 8/2002 | Jain et al. | 380/277 |
| 2003/0018964 | A1* | 1/2003 | Fox et al. | 717/177 |
| 2003/0084306 | A1* | 5/2003 | Abburi et al. | 713/188 |
| 2005/0210237 | A1* | 9/2005 | Balaz et al. | 713/153 |

OTHER PUBLICATIONS

Zao et al, "A Public-Key Based Secure Mobile IP", Wireless Networks, ACM, US, vol. 5, No. 5, Oct. 1999, pp. 373-390.

EP Search Report, mailed Sep. 13, 2002.

GB Search Report, mailed Oct. 1, 2002.

Sufatrio et al, "Mobile IP Registration Protocol: A Security Attack and New Secure Minimal Public-Key Based Authentication", Parallel Architectures, Algorithms, and Networks, 1999 (I-Span '99), Proceedings, Fourth International Symposium on Perth/Fremantle, WA, Australia Jun. 23-25, 1999, IEEE Compt. Soc., pp. 364-360.

Zao et al, "Public-Key Based Secure Mobile IP", Wireless Networks, ACM, US, vol. 5, No. 5, Oct. 1999, pp. 373-390.

International Search Report mailed May 7, 2003 in corresponding PCT application PCT/SE02/01904.

* cited by examiner

Binding Update from MR to CN: MN has moved from A#1 to A#2.

ADDRESSING MECHANISMS IN MOBILE IP

FIELD OF THE INVENTION

The present invention relates to addressing mechanisms in Mobile IP and more particularly to addressing mechanisms which enable IP network nodes to prove that they are authorised to alter or update information relating to an IP address which is owned by another network node.

BACKGROUND TO THE INVENTION

The massive growth in the use of the Internet has exposed weaknesses and limitations of the current Internet protocol known as IPv4. The Internet Engineering Task Force (IETF), which is a loose connection of interested parties, is therefore developing an enhanced Internet protocol known as IPv6. IPv6 incorporates a much improved security mechanism known as IPSec (which enables two or more parties to communicate securely over the Internet) as well as provisions for mobile Internet access (Mobile IP). Mobile IP allows users to access the Internet on the move, roaming from one IP access node to another. Mobile IP will be used in particular by those accessing the Internet via wireless mobile devices (connected for example to wireless LANs and cellular telephone networks).

IPv6 provides for a much larger IP address space, providing IP addresses of 128 bits in length. The first 64 bits of an address form a routing prefix which uniquely identifies the Internet access node (or so-called "local link") used by an IP terminal or host, whilst the last 64 bits form a host suffix which uniquely identifies the mobile terminal to the access node (or within the local link). The host suffix is referred to as an "interface identifier" as it identifies the host uniquely over the access interface. Typically, when a host registers with an access node, the host learns the routing prefix of the access node from an advertisement message sent from the access node. According to RFC3041 (IETF), a host then generates its interface identifier using a random number generated by the host. The host may additionally use a link layer address to generate the interface identifier, the link layer address being for example a MAC layer address used by the access network.

As already mentioned, Mobile IP allows hosts to roam between access nodes and even access networks, a feature which requires that hosts be allowed to change the IP addresses which define their current physical locations. Typically, a mobile host is allocated a "fixed" home IP address in a home network. When the host is at home, it can use this home address as its physical address. However, when a host attaches itself to a "foreign" access node, the host is allocated a temporary "care-of-address". Hosts corresponding with the mobile host maintain a binding cache containing mappings between home addresses and care-of-addresses. For incoming packets, the Mobile IP layer at a correspondent host exchanges the care-of-address for the home address in the destination field, whilst for outgoing packets the mobile IP layer at a correspondent host exchanges the home address for the care-of-address in the destination address field. When a mobile host obtains a new care-of-address, it must send a binding update message to all correspondent hosts in order to update their binding caches (thus ensuring that subsequent datagrams are sent to the correct care-of-address). A Mobile IP scenario is illustrated in FIG. 1.

A potential risk of this mechanism is that a malicious third party may be able to send a falsified binding update to a correspondent host to cause data packets intended for a mobile host to be routed to the malicious party. If the packets are then forwarded to the mobile host by the malicious party (after being opened and read by that party), the mobile host may not even know that its packets are being re-routed and read. This problem is not limited to Mobile IP, but is also present in other signalling functions within the IPv6 architecture. The Mobile IP related problem and some of the other problems are described in more detail in the IETF submission "draft-nikander-ipng-address-ownership-00.txt" of February 2001.

A solution to this problem has been proposed in the IETF submission "draftbradner-pbk-frame-00.txt" of February 2001. This involves generating at the mobile host a purpose built key (PBK) pair comprising a public and a private key. An Endpoint ID (EID) is generated at the mobile host by applying a hash to the public key. The EID is sent to a correspondent host soon after initiation of an IP connection. Subsequently, the mobile host sends to the correspondent host the public key. The correspondent host is able to verify that the public key "belongs" to the connection by applying the one-way coding function to the key and comparing the result with the previously received EID. Any binding update which is subsequently sent, is signed at the mobile host with the host's private key. The correspondent host verifies the signature attached to the binding update using the previously received public key. Improved solutions offering enhanced security have been described in: P. Nikander, <draft-nikander-ipng-pbk-addresses-00.txt>, Ericsson Nomadiclab, March 2001, "A Scaleable Architecture for IPv6 Address Ownership"; G. Montenegro, C. Castelluccia, Jul. 20, 2001, SUCV Identifiers and Addresses, Internet Draft (Work In Progress); and M. Roe. Microsoft, August 2001, "Authentication of Mobile IPv6 Binding Updates and Acknowledgements", Internet Draft (Work In Progress), http://www.ietf.org/internet-drafts/draft-roe-Mobile IP-updateauth-00.txt.

SUMMARY

The solutions identified in the preceding paragraph can deal only with the case where the owner of the address sends the Binding Update. However, there are a few situations with it is necessary for other nodes to send these notifications on behalf of the real owner. For example, DHCP servers that manage an address pool own the addresses but would still like to allow the users of those addresses to benefit from mobility (see FIG. 2). Also, a node could be behind a mobile router and would need to delegate the Binding Update sending to this router, even if the actual address is owned by the node itself (FIG. 3, where a mobile node MN has moved from a first Access Router AR#1 to a second Access Router AR#2).

What is common to the two situations described is that the delegation of responsibility for the IP address is limited and conditional. A router is not allowed to send Binding Updates after a node has moved outside the network controlled by the router. The DHCP server does not allow a node to send a Binding Update in respect of a given address, after that address has been released by the node and given to some other node.

According to a first aspect of the present invention there is provided a method of delegating responsibility for an IP address owned by a first IP network node to a second IP network node, at least a part of the IP address being derivable from a public key of a public/private key pair belonging to the first node, the method comprising:

notifying the first node of a public key of a public/private key pair belonging to the second node;

at the first node, signing the public key of the second node with the private key of the first node to provide an authorisation certificate; and sending the authorisation certificate from the first node to the second node, wherein the authorisation certificate is subsequently included with messages relating to said IP address and signed with the private key of the second node, sent from the second node to receiving nodes, and is used by the receiving nodes to verify the second node's claim on the IP address.

In one embodiment of the present invention, said first IP network node is a DHCP server, and said second IP network node is a client node, for example a mobile terminal (e.g. mobile telephone, PDA, communicator, palmtop computer, or laptop computer) or a PC. The client node may be connected to an IP network via a fixed line or a wireless link. In a second embodiment of the invention, said first IP network node is a client node and said second IP network node is a mobile router.

Preferably, an Interface Identifier part of said IP address is derivable from the public key of the public/private key pair belonging to the first node, e.g. by applying a one-way function to that public key.

Preferably, the method of the present invention facilitates the sending of binding update messages according to the Mobile IP protocol, by the second node in respect of said IP address. Such binding update messages include the authorisation certificate, said IP address, and a new care-of-address. The certificate may include the public key of the first node and which is required to authenticate the certificate.

Said certificate may be derived by signing, with the private key of the first (or owning) node, a combination of the public key of the second (or originating) node and a time stamp, the time stamp being the time at which the authorisation for using the IP address expires.

According to a second aspect of the present invention there is provided a method of authenticating a message received at a receiving node of an IP network from an originating node, the message relating to an IP address and comprising
said IP address,
a public key of a public/private key pair belonging to the node owning the IP address, and
a certificate issued to the originating node by the owning node and derived by signing the public key of a public/private key pair belonging to the originating node with the private key of the owning node,
the message being signed with the private key of the originating node, the method comprising:
confirming that at least a part of said IP address is derivable from the public key of the owning node;
confirming that said certificate is signed with the private key of the owning node; and
confirming that the message is signed with the private key of the originating node.

Where said certificate is derived by signing both the public key of the public/private key pair belonging to the originating node and a time-stamp, the receiving node may confirm that the time-stamp has not expired prior to acting upon the message.

According to a third aspect of the present invention there is provided an IP client terminal arranged in use to lease an IP address from another IP network node, at least a part of the IP address being derivable from a public key of a public/private key pair belonging to the owning node, the client terminal comprising:

means for notifying the owning node of a public key of a public/private key pair belonging to the client terminal;
means for receiving from the owning node, an authorisation certificate including the public key of the client terminal signed with the private key of the owning node;
wherein the authorisation certificate is subsequently included with messages relating to said IP address and signed with the private key of the client terminal, sent from the client terminal to receiving nodes, and is used by the receiving nodes to verify the client terminal's claim on the IP address.

According to a fourth aspect of the present invention there is provided an IP client terminal arranged in use to authorise a delegated IP network node to use an IP address owned by the client terminal, at least a part of the IP address being derivable from a public key of a public/private key pair belonging to the client terminal, the client terminal comprising:
means for receiving from said delegated node a public key of a public/private key pair belonging to the delegated node;
means for generating an authorisation certificate including the public key of the delegated node signed with the private key of the client terminal, and for sending the certificate to the delegated node;
wherein the authorisation certificate is subsequently included with messages relating to said IP address and signed with the private key of the delegated node, sent from the delegated node to receiving nodes, and is used by the receiving nodes to verify the delegated node's claim on the IP address.

According to a fifth aspect of the present invention there is provided an IP server arranged in use to authorise a client IP node to use an IP address owned by the server, at least a part of the IP address being derivable from a public key of a public/private key pair belonging to the server, the server comprising:
means for receiving from said client terminal a public key of a public/private key pair belonging to the client terminal;
means for generating an authorisation certificate including the public key of the client terminal signed with the private key of the server, and for sending the certificate to the client terminal;
wherein the authorisation certificate is subsequently included with messages relating to said IP address and signed with the private key of the client terminal, sent from the client terminal to receiving nodes, and is used by the receiving nodes to verify the client terminal's claim on the IP address.

According to a sixth aspect of the present invention there is provided an IP server arranged in use to assume responsibility for an IP address owned by a client terminal, at least a part of the IP address being derivable from a public key of a public/private key pair belonging to the client terminal, the server comprising:
means for sending to said client terminal a public key of a public/private key pair belonging to the server;
means for receiving from the client terminal, an authorisation certificate including the public key of the server signed with the private key of the client terminal;
wherein the authorisation certificate is subsequently included with messages relating to said IP address and signed with the private key of the server, sent from the server to receiving nodes, and is used by the receiving nodes to verify the server's claim on the IP address.

DETAILED DESCRIPTION OF CERTAIN EMBODIMENTS

Figure 1:
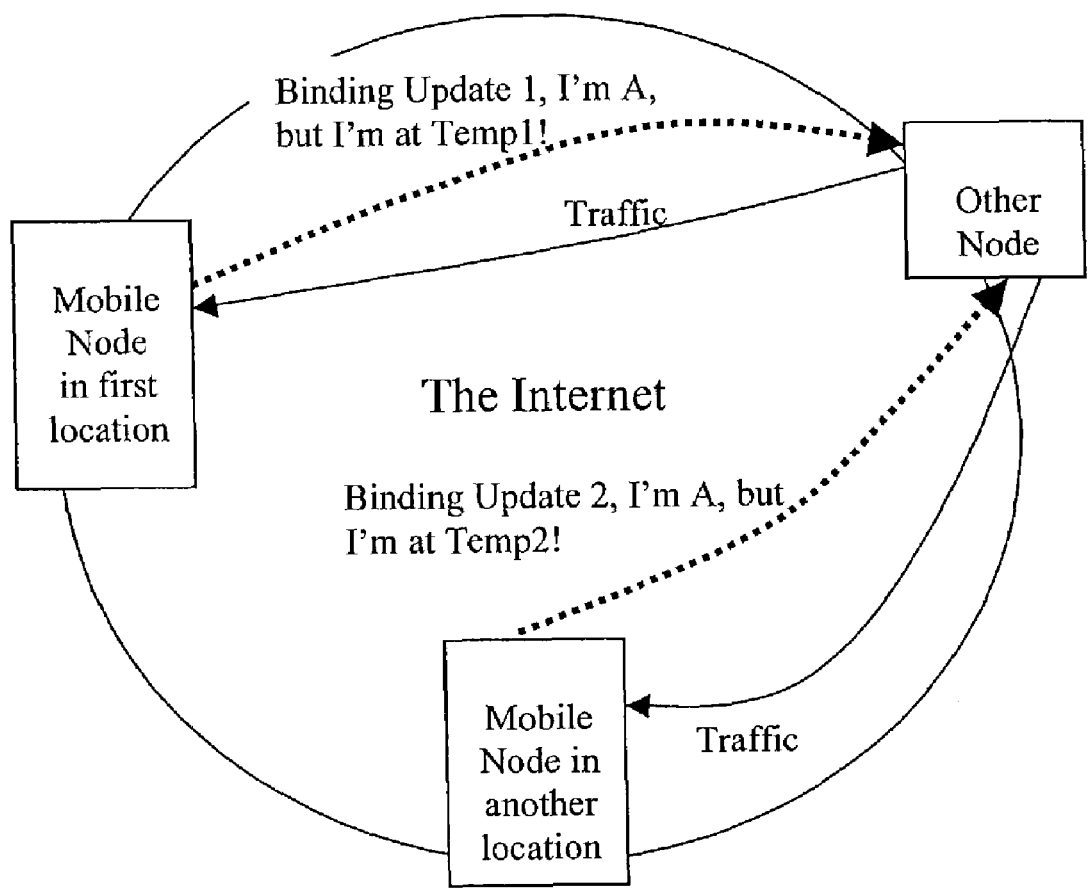
FIG. 1 illustrates schematically the principles of Mobile IP routing.

For the purpose of the following examples it is assumed that an IP network node owning an IP address possesses a public-private key pair where P denotes the public key and S denotes the private or secret key. The node generates the IP address using the algorithm A=R:h(P), where R is some routing prefix which may belong to the node itself or which may be received at the node from some other node (e.g. an access node). The function h is some one-way function, such as a cryptographic hash. When the node (owning the IP address) sends a binding update to a correspondent node according to the Mobile IP protocol, it includes in the message its public key P. The sending node additional generates a signature by applying some reversible cryptographic function and the secret key S to the contents of the message, and adds the signature to the message.

When the correspondent node receives the binding update it first verifies that the signature is correct by applying the reversible cryptographic function and the public key P contained in the message, to the signature. Assuming that the result corresponds to the contents of the message, and the correspondent node therefore verifies that the sending node owns the claimed public key S, the correspondent node applies the one-way function h to the public key to confirm that the host part of the source IP address has been generated by the owner of the key pair (P,S). Whilst it is possible for an attacker to go through all possible key pairs (P,S) trying to find one that will produce the same value of h(P), given that the bit field used to store h(P) in Ipv6 is very large (62 bits), an immense amount of work would have to be done to achieve this.

DHCP servers manage a pool of IP addresses, which they own, and "lease" these addresses temporarily to client nodes, such as PCs attached to a particular network. Applying the above considerations to this scenario (illustrated in FIG. 2), it will be the DHCP server which owns the public-private key pairs (P,S) which are used to generate respective IP addresses.

In order to allow for a client node behind a DHCP server to use mobility and Binding Updates, the following the procedure is employed:

1. The client and DHCP server agree on a particular address to be leased by the client for a certain duration. The address A contains an interface identifier part which is associated with the key pair (P, S) owned by the DHCP, i.e. A=R:h(P).
2. The client may be optionally authenticated during this process.
3. The client owns a public-private key pair (PcI,ScI) and gives its public key PcI to the DHCP server during this process. The public-private key pair may have been generated just for this purpose, or may be permanently assigned to the client.
4. The DHCP server creates a certificate for PcI to administer the address related to P. That is, the server signs the tuple [PcI, end-time] with its private key S, where the end-time identifies the time of expiry of the allocated IP address. The certificate, containing P and the signature, is sent to the client.
5. When the client node wishes to send a Binding Update to some correpondent node, it signs the request with its private key ScI and attaches the certificate (created in Step 4) to the message.
6. The node receiving the Binding Update first verifies that the value of the interface identifier part of the sender's IP address is related to the public key P, by applying the one-way function h which is known to the correspondent node, to the public key P. The receiving node then uses the DHCP's public key P to verify that the certificate is correctly signed with the corresponding secret key S and recovers the sender's public key PcI and the valid end-time. Assuming that the end-time has not expired, the receiving node verifies that the signature in the Binding Update was produced with the private key ScI corresponding to the public key PcI contained in the certificate, thus proving that the sending node owns the public key PcI. The receiving node then updates its binding cache with the new care-of-address.

Figure 4:
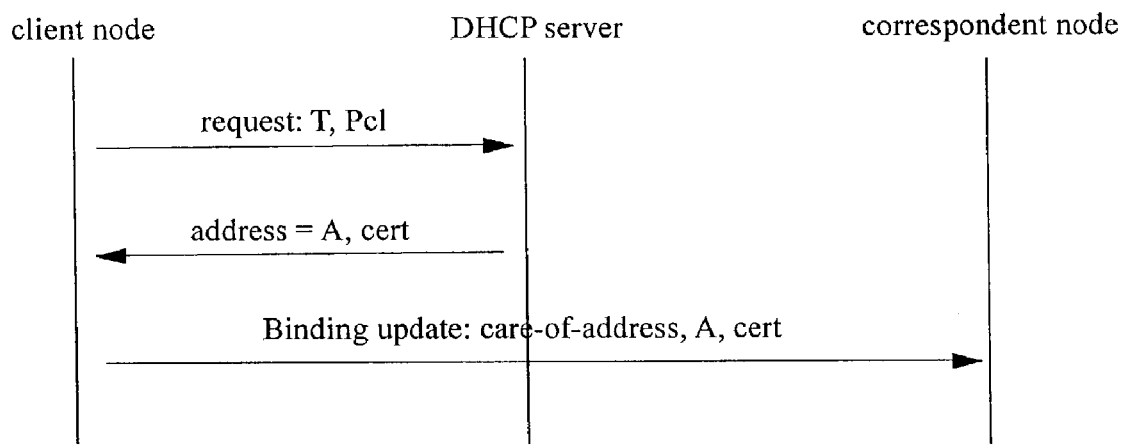
FIG. 4 is a signalling diagram showing signalling between a mobile node, a DHCP server and a correspondent node.

The procedure can be illustrated with the following signalling flow which is illustrated in FIG. 4:

1. Client-Server: Request; duration=T, client public key=PcI
2. Server-Client: Response; address=A, certificate=P, {[PcI, end-time] signed with S}
3. Client-Other node: Binding Update; care-of-address, address=A, certificate, signature on the whole message with ScI.

Figure 2:
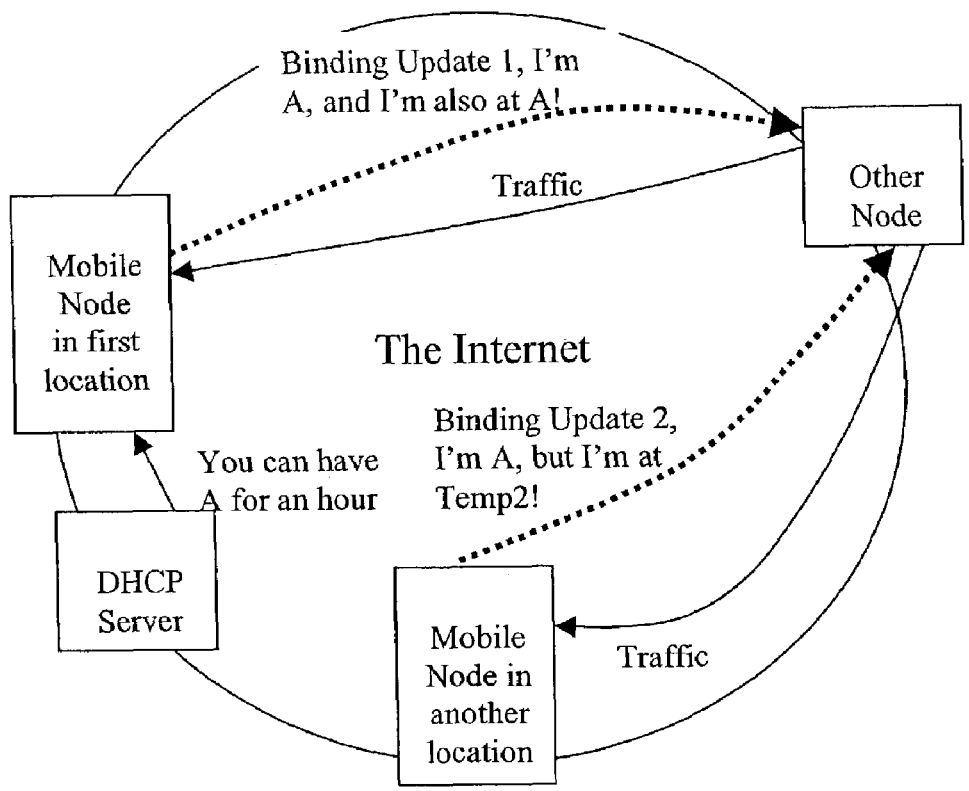
FIG. 2 illustrates schematically the principles of Mobile IP routing where an IP address is owned and allocated by a DHCP server.
Figure 3:
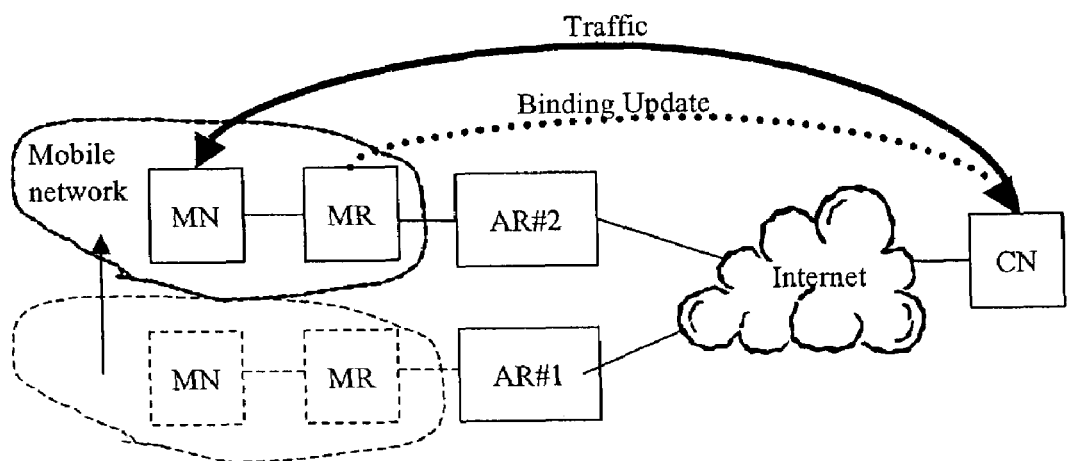
FIG. 3 illustrates schematically the principles of Mobile IP routing where a mobile node is located behind a mobile router.

Nodes may sometimes be located behind a mobile router (MR) as illustrated in FIG. 2, and as the router is responsible for managing the connectivity towards the Internet, it may have to send Binding Updates on the behalf of the nodes. The node may also move out from behind the mobile router, in which case the router should no longer wishes offer this service. A procedure to allow the mobile router to temporarily send binding message on behalf of a node is as sollows:

1. The node and router agree on a particular address(es) to be behind the router for a certain duration, and for the mobility management to be performed by the router. The address is associated with the key pair (P,S) which is owned by the node.
2. The node and the router may be optionally authenticated to each other during this process.
3. The router gives its own public key Pr to the node during this process. This public key is typically permanently assigned to the router. The router knows also the secret key Sr.
4. The node creates a certificate for Pr to administer the address related to P. That is, the node signs the tuple [Pr, end-time] with S. The certificate comprises: P and the signature.
5. When the router wishes to send a Binding Update to some correspondent node over the Internet, it signs the request with Sr and attaches the certificate created in Step 4 to the message.
6. The correspondent node receiving the Binding Update first verifies that the value of the interface identifier part of the node's IP address (contained in the binding update message) is related to the public key P, by applying the one-way function h which is known to the correspondent node, to the public key P. The receiving node uses the public key P to verify that the certificate is correctly signed with the corresponding secret key S and recovers the sending router's public key Pr and the valid end-time. It then verifies that the signature in the Binding Update was produced with the private key Sr corresponding to the public key Pr contained in the certificate, thus proving that the sending router owns the public key Pr. Assuming that the end-time has not expired, the receiving node updates its binding cache with the new care-of-address.

Figure 5:
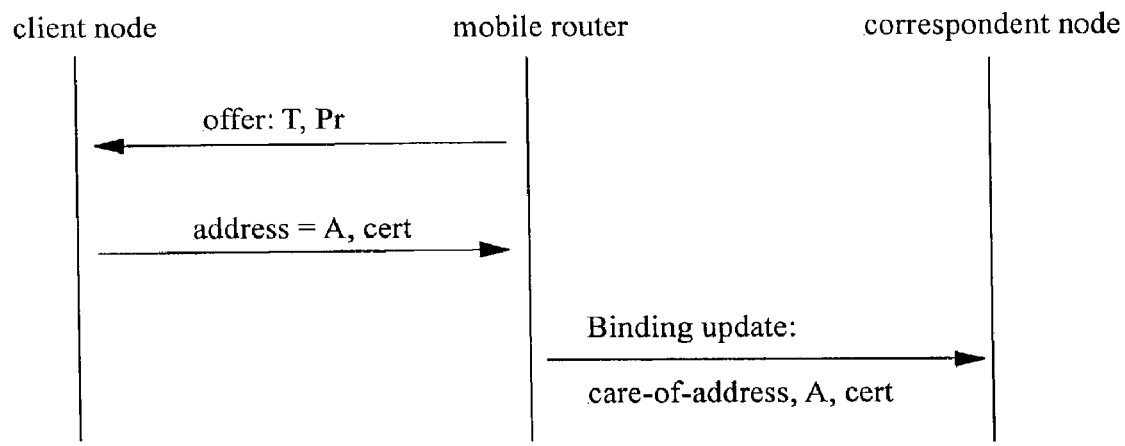
FIG. 5 is a signalling diagram showing signalling between a mobile node, a mobile router and a correspondent node.

The procedure can be illustrated with the following signalling flow which is also illustrated in FIG. 5:
1. Router-Node: Offer service; duration=T, router public key=Pr
2. Node-Router: Start; address=A, certificate=P, {[Pr, end-time] signed with S}
3. Router-Other node: Binding Update; care-of-address, address=A, signature on the whole message with Sr.

It will be appreciated by the person of skill in the art that various modifications may be made to the above described embodiments without departing from the scope of the present invention.

The invention claimed is:

1. A method of delegating responsibility for an IP address owned by a first IP network node to a second IP network node, at least a part of the IP address being derivable from a public key of a public/private key pair belonging to the first node, the method comprising:
notifying the first node of a public key of a public/private key pair belonging to the second node;
at the first node, signing the public key of the second node with the private key of the first node to provide an authorisation certificate; and
sending the authorisation certificate from the first node to the second node;
wherein the authorisation certificate is subsequently included with messages relating to said IP address and signed with the private key of the second node, sent from the second node to receiving nodes, and is used by the receiving nodes to verify that the first node has delegated responsibility for its IP address to the second node.

2. A method according to claim 1, wherein said first IP network node is a DHCP server, and said second IP network node is a client node.

3. A method according to claim 1, wherein said first IP network node is a client node and said second IP network node is a mobile router.

4. A method according to claim 1, wherein an Interface Identifier part of said IP address is derivable from the public key of the public/private key pair belonging to the first node.

5. A method according to claim 1, wherein said messages are binding update messages according to the Mobile P protocol and include the authorization certificate, said IP address, and a new care-of-address.

6. A method according to claim 1, wherein said certificate is derived by signing, with the private key of the first node, a combination of the public key of the second node and a time stamp, the time stamp being the time at which the authorisation for using the IP address expires.

7. A method of authenticating a message received at a receiving node of an IP network from an originating node, the message relating to an IP address and comprising:
said IP address,
a public key of a public/private key pair belonging to the node owning the IP address, and
a certificate issued to the originating node by the owning node and derived by signing the public key of a public/private key pair belonging to the originating node with the private key of the owning node,
the message being signed with the private key of the originating node, the method comprising:
confirming that at least a part of said IP address is derivable from the public key of the owning node;
confirming that said certificate is signed with the private key of the owning node; and
confirming that the message is signed with the private key of the originating node and thereby authenticating the message.

8. A method according to claim 7, where said certificate is derived by signing both the public key of the public/private key pair belonging to the originating node and a time-stamp, and the receiving node confirms that the time-stamp has not expired prior to acting upon the message.

9. An IP client terminal arranged in use to lease an IP address from another IP network node, at least a part of the IP address being derivable from a public key of a public/private key pair belonging to the owning node, the client terminal comprising:
means for notifying the owning node of a public key of a public/private key pair belonging to the client terminal;
means for receiving from the owning node, an authorisation certificate including the public key of the client terminal signed with the private key of the owning node;
wherein the authorisation certificate is subsequently included with messages relating to said IP address and signed with the private key of the client terminal, sent from the client terminal to receiving nodes, and is used by the receiving nodes to verify that the owning node has leased at least a part of the IP address to the client terminal.

10. An IP client terminal arranged in use to authorise a delegated IP network node to use an IP address owned by the client terminal, at least a part of the IP address being derivable from a public key of a public/private key pair belonging to the client terminal, the client terminal comprising:
means for receiving from said delegated node a public key of a public/private key pair belonging to the delegated node;
means for generating an authorisation certificate including the public key of the delegated node signed with the private key of the client terminal, and for sending the certificate to the delegated node;
wherein the authorisation certificate is subsequently included with messages relating to said IP address and signed with the private key of the delegated node, sent from the delegated node to receiving nodes, and is used by the receiving nodes to verify that the client terminal has authorized the delegated node to use the IP address owned by the client terminal.

11. An IP server arranged in use to authorise a client IP node to use an IP address owned by the server, at least a part of the P address being derivable from a public key of a public/private key pair belonging to the server, the server comprising:
means for receiving from said client terminal a public key of a public/private key pair belonging to the client terminal;

means for generating an authorisation certificate including the public key of the client terminal signed with the private key of the server, and for sending the certificate to the client terminal;

wherein the authorisation certificate is subsequently included with messages relating to said IP address and signed with the private key of the client terminal, sent from the client terminal to receiving nodes, and is used by the receiving nodes to authenticate the messages.

12. An IP server arranged in use to assume responsibility for an IP address owned by a client terminal, at least a part of the IP address being derivable from a public key of a public/private key pair belonging to the client terminal, the server comprising:

means for sending to said client terminal a public key of a public/private key pair belonging to the server;

means for receiving from the client terminal, an authorisation certificate including the public key of the server signed with the private key of the client terminal;

wherein the authorisation certificate is subsequently included with messages relating to said IP address and signed with the private key of the server, sent from the server to receiving nodes, and is used by the receiving nodes to verify that the server has assumed responsibility for the IP address owned by the client terminal.

* * * * *

UNITED STATES PATENT AND TRADEMARK OFFICE
CERTIFICATE OF CORRECTION

PATENT NO. : 7,401,216 B2
APPLICATION NO. : 10/277945
DATED : July 15, 2008
INVENTOR(S) : Arkko et al.

It is certified that error appears in the above-identified patent and that said Letters Patent is hereby corrected as shown below:

Title page, Item (56), under "OTHER PUBLICATIONS", in Column 2, Lines 3-7, delete "Sufatrio et al, "Mobile...............Soc., pp. 364-360.".

Title page, Item (56), under "OTHER PUBLICATIONS", in Column 2, Lines 8-9, delete "Zao et al, "Public-Key.........pp. 373-390.".

In Column 1, Line 11, delete "BACKGROUND TO" and insert -- BACKGROUND OF --, therefor.

In Column 6, Line 11, delete "correpondent" and insert -- correspondent --, therefor.

In Column 6, Line 45, delete "sollows:" and insert -- follows: --, therefor.

In Column 7, Line 56, in Claim 5, delete "Mobile P" and insert -- Mobile IP --, therefor.

In Column 8, Line 62, in Claim 11, delete "P address" and insert -- IP address --, therefor.

Signed and Sealed this

Sixth Day of October, 2009

David J. Kappos
*Director of the United States Patent and Trademark Office*